(12) United States Patent
Vandermeijden

(10) Patent No.: US 9,459,729 B2
(45) Date of Patent: Oct. 4, 2016

(54) SENSING BASELINE MANAGEMENT

(71) Applicant: Synaptics Incorporated, San Jose, CA (US)

(72) Inventor: Tom Vandermeijden, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 147 days.

(21) Appl. No.: 14/091,173

(22) Filed: Nov. 26, 2013

(65) Prior Publication Data
US 2015/0145835 A1 May 28, 2015

(51) Int. Cl.
*G06F 3/041* (2006.01)
*G06F 3/044* (2006.01)

(52) U.S. Cl.
CPC .............. *G06F 3/0418* (2013.01); *G06F 3/044* (2013.01); *G06F 3/0412* (2013.01); *G06F 3/0416* (2013.01); *G06F 2203/04108* (2013.01)

(58) Field of Classification Search
CPC .............. G06F 3/0418; G06F 3/0412; G06F 2230/04108
See application file for complete search history.

(56) References Cited

U.S. PATENT DOCUMENTS

| | | | |
|---|---|---|---|
| 2011/0208781 A1* | 8/2011 | Liu et al. ...................... | 707/793 |
| 2012/0229419 A1* | 9/2012 | Schwartz et al. ............. | 345/174 |
| 2012/0300988 A1* | 11/2012 | Ivanov et al. ................ | 382/115 |

* cited by examiner

*Primary Examiner* — Shaheda Abdin
(74) *Attorney, Agent, or Firm* — Osha Liang LLP

(57) ABSTRACT

A processing system for sensing includes a sensor module that includes sensor circuitry coupled to sensor electrodes, the sensor module configured to acquire a sensor frame, and a determination module connected to the sensor electrodes. The determination module is configured to determine a first delta frame from the sensor frame and a first baseline generated using a first processing mode, and determine a second delta frame from the sensor frame and a second baseline generated using a second processing mode. The second processing mode is different than the first processing mode. The determination module is further configured to determine that the first delta frame and the second delta frame are inconsistent with respect to at least one input object. The processing system copies at least a portion of the second baseline to the first baseline based on the first delta frame and the second delta frame being inconsistent.

20 Claims, 7 Drawing Sheets

SENSING BASELINE MANAGEMENT

FIELD OF THE INVENTION

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a processing system for sensing. The processing system includes a sensor module that includes sensor circuitry coupled to sensor electrodes, the sensor module configured to acquire a sensor frame, and a determination module connected to the sensor electrodes. The determination module is configured to determine a first delta frame from the sensor frame and a first baseline, where the first baseline is generated using a first processing mode, and determine a second delta frame from the sensor frame and a second baseline, where the second baseline is generated using a second processing mode, and where the second processing mode is different than the first processing mode. The determination module is further configured to determine that the first delta frame and the second delta frame are inconsistent with respect to at least one input object. The processing system copies at least a portion of the second baseline to the first baseline based on the first delta frame and the second delta frame being inconsistent with respect to the at least one input object.

In general, in one aspect, embodiments relate to an input device that includes an array of sensor electrodes configured to sense input objects in a sensing region of the input device, and a processing system. The processing system is configured to determine a first delta frame from a sensor frame and a first baseline, where the sensor frame is acquired from the array of sensor electrodes, wherein the first baseline is generated using a first processing mode, and determine a second delta frame from the first sensor frame and a second baseline, where the second baseline is generated using a second processing mode. The second processing mode is different than the first processing mode. The processing system is further configured to determine that the first delta frame and the second delta frame are inconsistent with respect to at least one input object, and copy at least a portion of the second baseline to the first baseline based on the first delta frame and the second delta frame being inconsistent with respect to the at least one input object.

In general, in one aspect, embodiments relate to a method for sensing. The method includes determining a first delta frame from a sensor frame and a first baseline, where the first baseline is generated using a first processing mode, and determining a second delta frame from the sensor frame and a second baseline, where the second baseline is generated using a second processing mode. The second processing mode is different than the first processing mode. The method further includes determining that the first delta frame and the second delta frame are inconsistent with respect to at least one input object, and copying at least a portion of the second baseline to the first baseline based on the first delta frame and the second delta frame being inconsistent with respect to the at least one input object.

Other aspects of the invention will be apparent from the following description and the appended claims.

DETAILED DESCRIPTION

Figure 1:
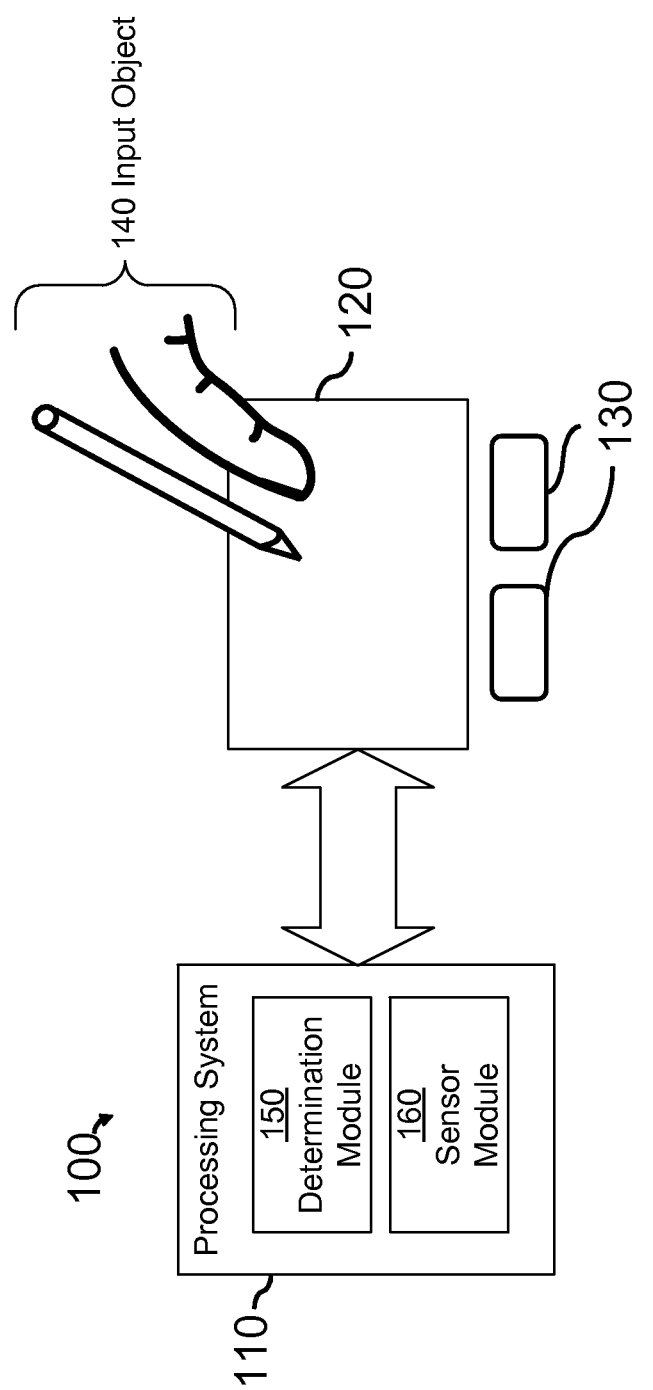
FIGS. 1, 2, and 3 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is used to distinguish between the elements. By way of an example, a first element is distinct from a second element, and the first element may encompass more than one element and succeed the second element in an ordering of elements.

In general, embodiments of the invention provide a mechanism for sensing baseline management. Specifically, one or more embodiments apply at least two processing modes to a sensor frame. Each processing mode has an associated baseline that is created based on the processing mode. Based on the processing mode's baseline, a delta frame for the processing mode is created and used to detect input objects. At least one of the processing modes is used to report detected input objects while at least another processing mode's baseline is used to validate first processing mode's baseline.

Specifically, once a miscalculation of the baseline, errors may persist until a new baseline is determined. For example, in some cases the miscalculation of the baseline will result in the input device erroneously determining that an input object is in the sensing region and/or the positional information for an input object in the sensing region. In this application, the term "ghost object" refers to an incorrect determination of an input object being in the sensing region. As described above, a ghost object may result from miscalculated baseline values, but may also arise from other circumstances. By way of another example error, the miscalculation of a baseline may cause dead spots (i.e., negative ghost objects). Dead spots are areas of the sensing region in which the presence of a real input object is not reported. A dead spot may occur, for example, when an object is on the sensing region when the baseline is captured and then removed from the sensing region. The position in which the object was located becomes a dead spot once the object is removed.

Once such a ghost object (i.e., positive or negative ghost object) exists on the input device, the ghost object can create a variety of problems. For example, such a ghost object can cause proximity sensor device to generate unwanted input, or incorrectly or not respond to real input by the user. As such, such a ghost object may impair the usability of the input device and/or the associated electronic system. Further, because the ghost object may prevent the input device from recalculating the baseline, some problems may persist for a significant period of time.

Figure 2:
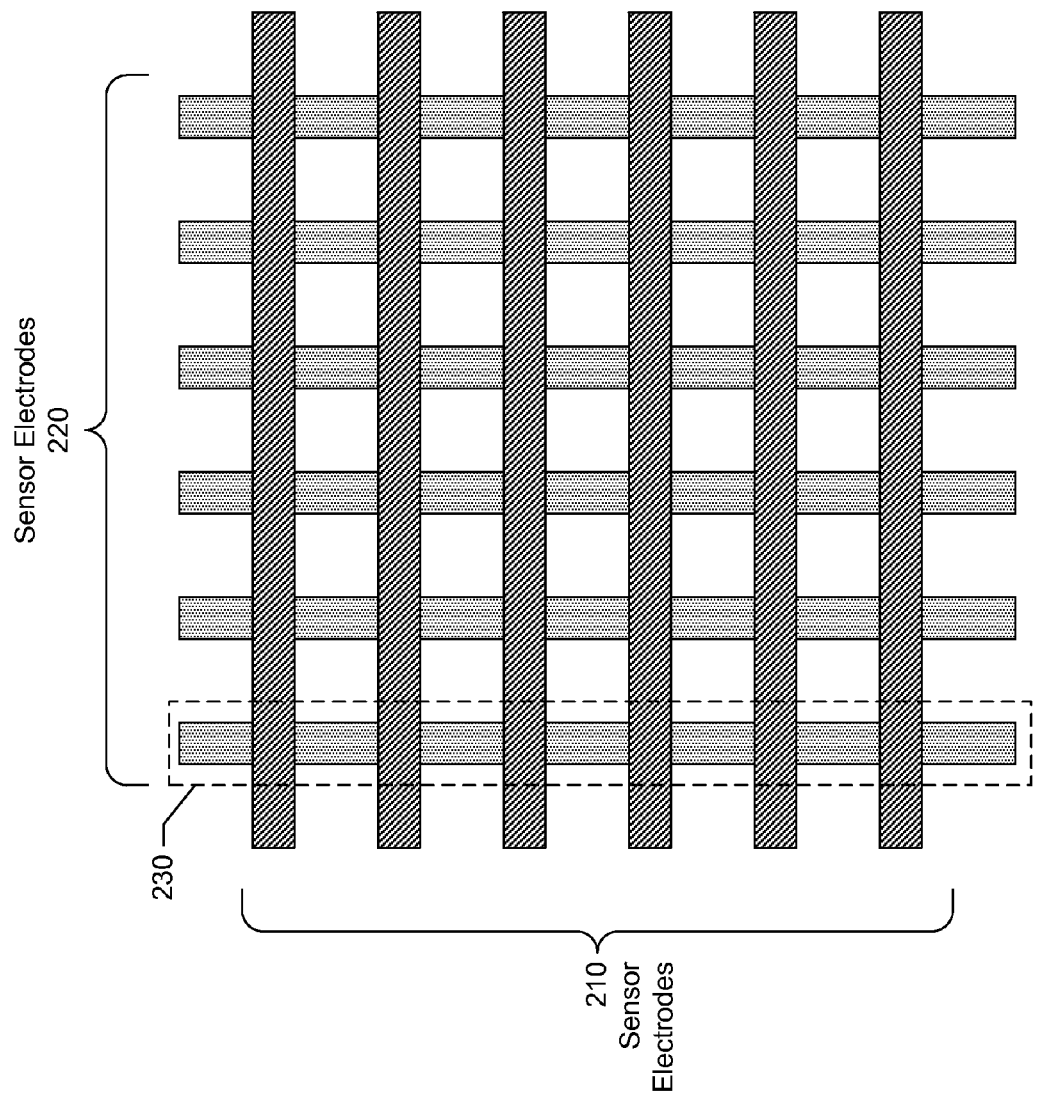

FIGS. 1 and 2 show schematic diagrams in accordance with one or more embodiments of the invention. FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) can be implemented as a physical part of the electronic system, or can be physically separate from the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad", "touch screen", or a "touch sensor device") configured to sense input provided by one or more input objects (140) in a sensing region (120). Example input objects include pen, stylus, finger, and other such objects (120).

Sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment. In some embodiments, the sensing region (120) extends from a surface of the input device (100) in one or more directions into space until signal-to-noise ratios prevent sufficiently accurate object detection. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a trans capacitance sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more input objects (140) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to sensing element(s) of input device (100), and one or more components elsewhere. For example, the input device (100) may be a peripheral coupled to a desktop computer, and the processing system (110) may include software configured to run on a central processing unit of the desktop computer and one or more ICs (perhaps with associated firmware) separate from the central processing unit. As another example, the input device (100) may be physically integrated in a phone, and the processing system (110) may include circuits and firmware that are part of a main processor of the phone. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, determine a type of input object, perform other determinations, or a combination thereof. The determination module (150) may include functionality to implement multiple processing modes (discussed below).

The sensor module (160) may include functionality to drive the sensing elements to transmit transmitter signals and receive resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. As another example, the display screen may be operated in part or in total by the processing system (110).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Turning now to FIG. 2, FIG. 2 shows an example of capacitive sensor electrodes in accordance with one or more embodiments of the invention. The number and positioning of sensor electrodes is not limited to the embodiment shown in FIG. 2. Specifically, FIG. 2 shows a portion of an example sensor electrode pattern configured to sense in a sensing region associated with the pattern, according to some embodiments. For clarity of illustration and description, FIG. 2 shows a pattern of simple rectangles, and does not show various components. The sensor electrodes may be of any shape and size and may be heterogeneous or homogeneous with respect to shape and size. In one or more embodiments of the invention, sensor electrodes (210) are configured as receiver electrodes and sensor electrodes (220) are configured as transmitter electrodes. In other embodiments, sensor electrodes (210) are configured to sense object position and/or motion the X direction and sensor electrodes (220) are configured to sense object position and/or motion in the Y direction.

Sensor electrodes (210) and (220) are may be ohmically isolated from each other. That is, one or more insulators separate sensor electrodes (210) and (220) and prevent the sensor electrodes from electrically shorting to each other. In some embodiments, sensor electrodes (210) and (220) are separated by insulative material disposed between them at cross-over areas; in such constructions, the sensor electrodes (210) and/or sensor electrodes (220) may be formed with jumpers connecting different portions of the same electrode. In some embodiments, sensor electrodes (210) and (220) are separated by one or more layers of insulative material. In some other embodiments, sensor electrodes (210) and (220) are separated by one or more substrates; for example, sensor electrodes (210) and (220) may be disposed on opposite sides of the same substrate, or on different substrates that are laminated together. The sensor electrodes may also be on the same layer with or without jumpers. Alternatively or additionally, some or all jumpers may be out of the sensing region. The jumpers and/or sensor electrodes may be in chip, on flex and/or border region. The sensor electrodes may be in any orientation, have any shape/size, and be placed on any number of substrates. The following description is not intended to be limited to any particular embodiment.

In various embodiments, the areas of localized capacitive coupling between transmitter electrodes and receiver electrodes may be termed "capacitive pixels" or "pixels". In other words, a pixel is an area of localized capacitive coupling between a transmitter electrode and a receiver electrode. The capacitive coupling between the transmitter electrodes and receiver electrodes change with the proximity and motion of input objects in the sensing region associated with the transmitter electrodes and receiver electrodes. In some embodiments of the invention, a pixel may be a single position in a projection along a particular axis. For example, for absolute capacitance sensing, a pixel may be a single position in a profile along the x-axis or a value in a profile along the y-axis.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings at the capacitive pixels.

A set of measured values from the capacitive pixels form a "capacitive image" (also "sensor frame") representative of the capacitive couplings at the pixels. In general, a sensor frame is a single capture by the sensing elements that provides the state of the sensing region using at least one sensing technology. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

A variety of different technologies may be used in implementing the input device and the various implementations may generate resulting signals indicative of object presence in a variety of formats. In one embodiment, the input device may receive resulting signals from the receiver electrodes and generate preliminary values that correspond to the measured capacitance associated with each pixel. In various embodiments, the measured capacitance may comprise effects corresponding to input objects in the sensing region, background capacitance, external interference, internal interference and other sources. The preliminary values may be based upon measures of absolute capacitance, transcapacitance, or some combination thereof. Furthermore, the resulting signals may be sampled, amplified, filtered, or otherwise conditioned as desirable to generate the preliminary values. For example, in one or more embodiments of the invention, an input object in the sensing region may decrease the measured capacitive coupling. However, the corresponding preliminary value may be represented as being positive, a negative of the measured capacitance. As such, while the measured capacitance may decrease the corresponding preliminary value is positive. In other embodiments, preliminary values corresponding to a decrease in the measured capacitive coupling may be represented as being negative.

In a typical embodiment, the preliminary values are then compared to corresponding baseline values in a baseline. For example, the difference between each preliminary value and its corresponding baseline value may be determined, and that difference then used as a measured value for determining input in the sensing region. In one embodiment, the baseline values conceptually serve as a reference point for measuring changes that occur over time. Further, the measured values may be considered to be delta values. Delta values are the change in the preliminary values compared to the corresponding baseline values. In one or more embodiments of the invention, a one to one correspondence exists between the preliminary values and their corresponding baseline values. Thus, every preliminary value is compared to the preliminary value's own corresponding baseline value to determine a measured value. In other embodiments, a baseline value may correspond to more than on preliminary value. The number of preliminary values generated and baseline values compared to may depend on the number of electrodes used and the sensing technology. In some embodiments the baseline values are included in a baseline.

In one or more embodiments, a baseline is an estimate of a background noise of a sensor device. The background noise of a sensor device is the sensor frame associated without any input object in the sensing region. The background noise changes with the environment and operating conditions, and may be estimated in various ways. The term baseline, as used herein, may be referred to as baseline images, baseline profiles, baseline measurements, baseline frames, or the like.

Figure 3:
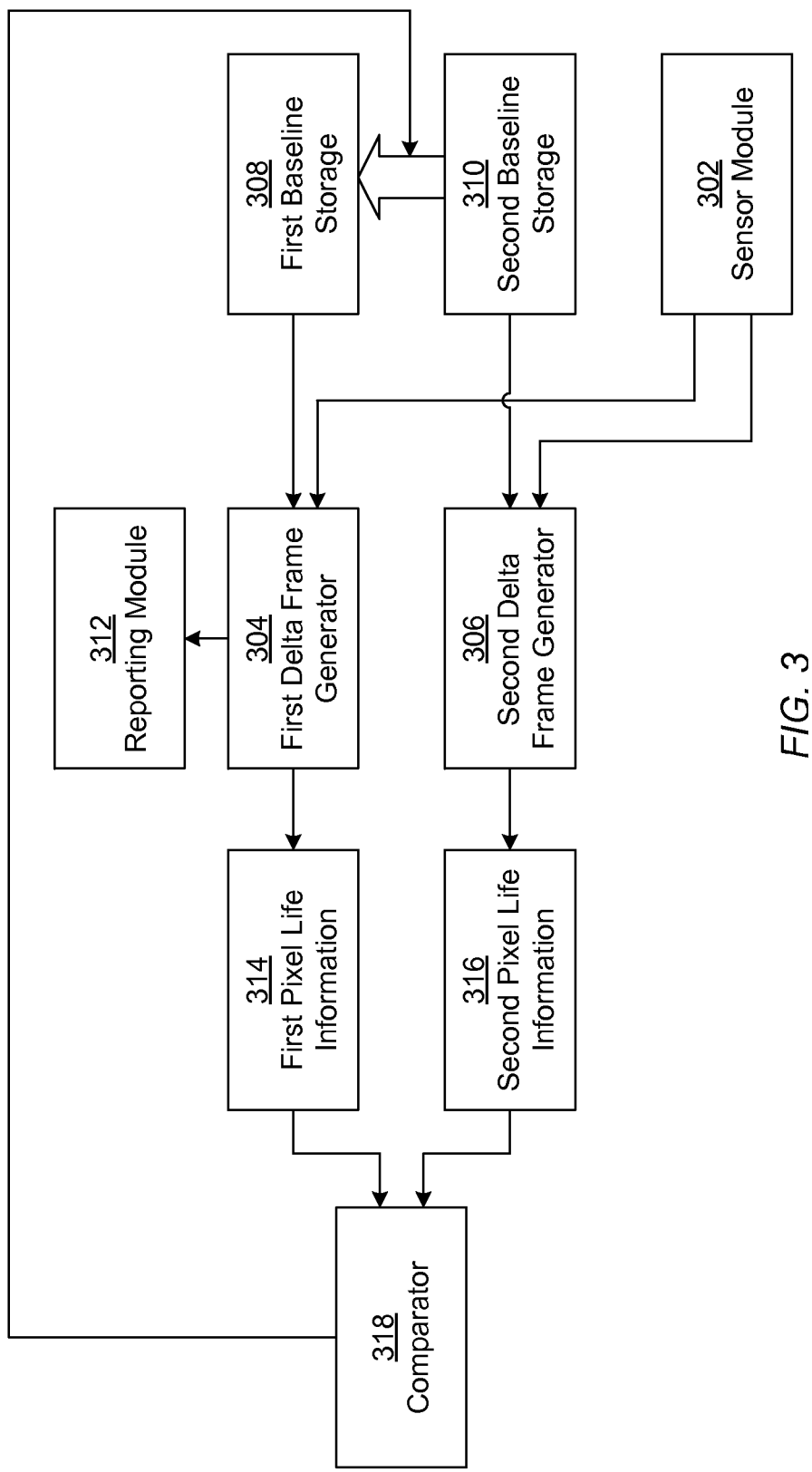

FIG. 3 shows a schematic diagram in accordance with one or more embodiments of the invention. In one or more embodiments of the invention, the components of FIG. 3 may be implemented, for example, in the processing system (100) of FIG. 1, such as in whole or in part in the determination module (150) and sensor module (160) of FIG. 1.

As shown in FIG. 3, the sensor module (302) provides input to a first delta frame generator (304) and a second delta frame generator (306). The sensor module (302) may be, for example, the same as sensor module (160) in FIG. 1. The input from the sensor module (302) is sensor frames that are provided to the delta frame generators when the sensor frames are generated.

In addition to the sensor module (302), baseline storage (e.g., first baseline storage (308), second baseline storage (310)) provides a baseline to the corresponding delta frame generator (e.g., first delta frame generator (304), second delta frame generator (306)). Baseline storage is a storage location for a baseline, such as volatile or non-volatile memory. The storage location may be the same or may change over time.

Each baseline is generated using a corresponding processing mode, such as by a corresponding processing mode module (not shown). The processing mode defines the estimation technique that is used to estimate the background noise. Each processing mode is different in that each processing mode uses a unique estimation technique from other processing modes. In other words, the first processing mode uses a unique estimation technique from the second processing mode.

Different processing modes may be used. For example, a processing mode is a snapshot mode. In the snapshot mode, at least one sensing frame is used as the baseline when an input object is not detected in the sensing region. For example, the at least one sensing frame may be selected as the new baseline when the signal to noise ratio is less than a defined threshold.

By way of another example, a processing mode may be a high pass temporal filter mode that is applied per pixel. The high pass temporal filter mode is a mode that over the span of multiple sensor frames transitions the value of each pixel in the baseline to the corresponding preliminary value in the sensor frame. The value of the pixel in the baseline is a baseline value. In particular, the processing system selectively changes a baseline value by a first amount in response to that baseline value being different from the corresponding preliminary value. This selective changing of baseline values occurs even when the processing system determines that an input object is in the sensing region. In one embodiment, selective changing of baseline value occurs even when the determination module determines that an input object is in the sensing region. Because changing the baseline reduces the corresponding measured values, changing the baseline may serve to reduce the effects of input objects that are in the sensing region. In other words, real or ghost objects that are detected may appear to melt into the baseline such that the input objects are no longer detected. In one or more embodiments, as the baseline values are changed over time, effects of input objects in the sensing region may be reduced over time. In other embodiments, effects of input objects in the sensing region may be completely reduced over time.

In one or more embodiments of the invention, selectively changing a baseline value by a first amount comprises selectively increasing the baseline value by the first amount in response to the baseline value being below a corresponding preliminary value. In one or more embodiments of the invention, selectively changing a baseline value by a first amount includes selectively decreasing the baseline value by the first amount in response to the baseline value being above a corresponding preliminary value. Further, in one or more embodiments of the invention, the first amount may be a constant amount or variable amount.

The reducing of the effects of detected objects occurs to both input objects that are actually in the sensing region and "hallucinated objects" that are not. Thus, as baseline values are changed in response to preliminary values being different from the baseline value, any effects due to hallucinated objects eventually will be reduced over time. Because the hallucinated objects would otherwise impair usability, the selective changing of baseline values may facilitate improved device performance.

Figure 4:
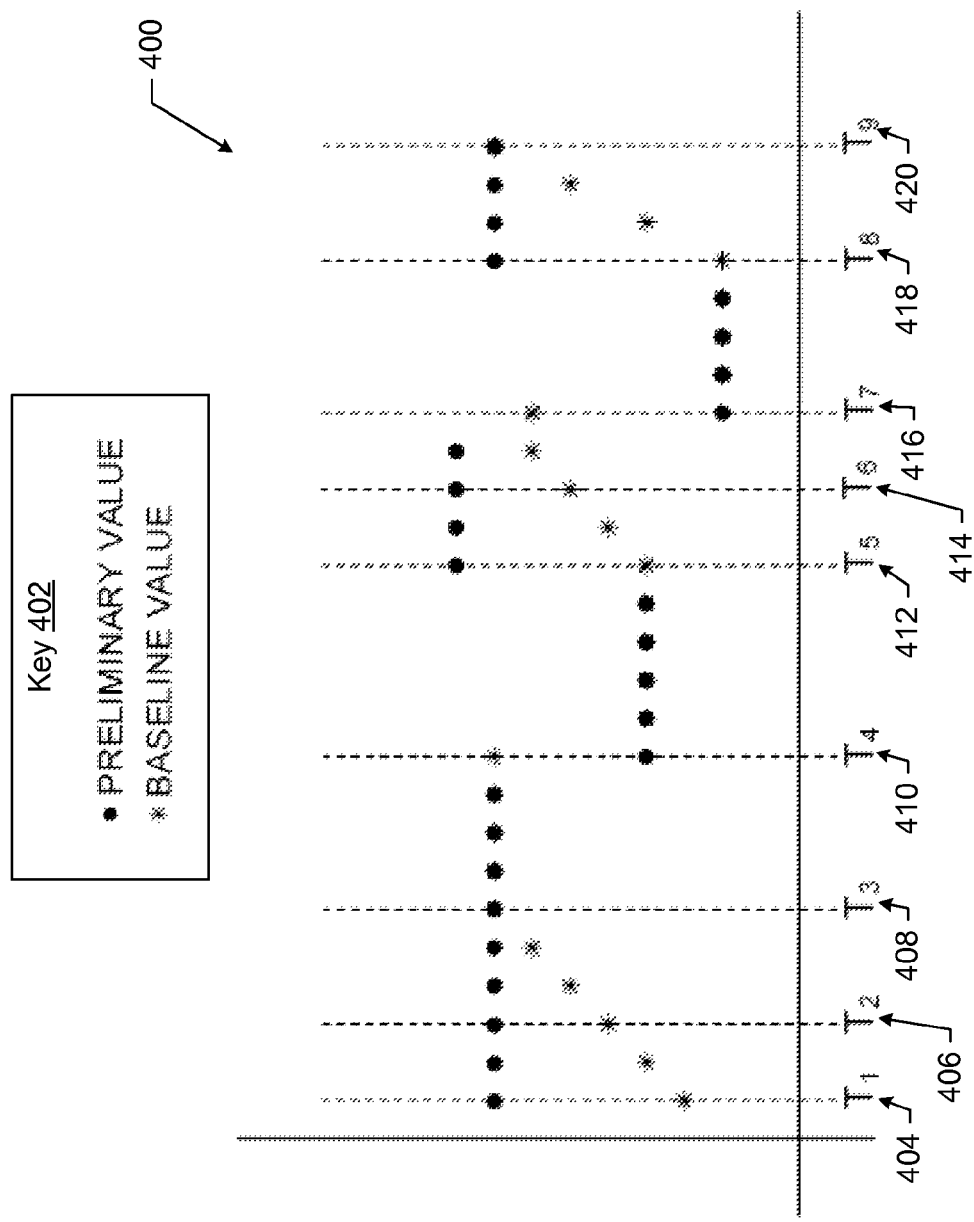
FIG. 4 shows an example in accordance with one or more embodiments of the invention.

FIG. 4 shows an example of a high pass temporal filter mode that is applied per pixel. Specifically, FIG. 4 shows a graph (400) of exemplary preliminary values and baseline values is illustrated. Specifically, the graph (400) shows exemplary changes in the preliminary values and the adjustments made to the corresponding baseline values over time for one node of a capacitive input device. In FIG. 4, the preliminary values are illustrated as filled circles, and the baseline values are illustrated as stars as shown in key (402). In one or more embodiments of the invention, FIG. 4 may be representative of a single capacitive pixel. While in FIG. 4 and the following description the baseline values are changed by a first amount in response to the preliminary value being above a corresponding baseline value and by a second amount in respond to the preliminary values being below a corresponding baseline values, similar description may be applied to embodiments where the baseline values are changed by a first amount in response to the preliminary value being below a corresponding baseline value and by a second amount in response to the preliminary value being above a corresponding baseline value.

In the graph (400), at time T1 (404), the preliminary value is above the corresponding baseline value. In response to the preliminary value being above the corresponding baseline value, the corresponding baseline value is increased by a first amount during each cycle that the preliminary value is above the baseline value. As shown in graph (400), the baseline value continues to be below the preliminary value and, thus, is continued to be increased in T2 (406) until time T3 (408).

At time T2 (406), an input object may be determined to be in the sensing region. The determination may be based on at least one of the magnitude of the measured value and a time element. In one embodiment, the time element includes the duration of time for which the magnitude of the measured value meets or exceeds a predetermined value. At time T3 (408), the baseline value equals the preliminary value, and as such the increasing of the baseline value stops. The baseline value and preliminary value remain equal until time T4 (410). At time T4 (410), the preliminary value drops, and in the next cycle the baseline value is selectively decreased to equal the preliminary value. The baseline value continues equal to the preliminary value until the preliminary value increases at time T5 (412). At time T5 (412), the selective increasing of baseline values resumes. The selective increasing continues between times T5 (412) and T7 (416), but before the baseline value again equals the preliminary value the preliminary value again drops at time T7 (416). Again, at time T6 (414), an input object may be determined to be in the sensing region.

In the next cycle, after time T7 (416), the baseline value is again selectively decreased to equal the preliminary value. The selective decreasing continues until the preliminary value increases at time T8 (418), and the baseline values again are again selectively increased. The amount of increase in the baseline values for each cycle is greater between time T8 (418) and time T9 (420) than between time T1 (404) and time t2 (406), thereby illustrating an embodiment where the first amount is not constant. For example, the first amount may be adjusted based upon the number of input objects determined to be in the sensing region. Thus, between time T8 (418) and time T9 (420), at least two input object are determined to be in the sensing region, and the first amount is thus increased.

As shown in FIG. 4, at time T3 (408), after the input object is detected at time T2 (406), the preliminary value equals the baseline value. In one embodiment, at time T3 (408) the input object may no longer be detected as being in the sensor region, as the measured value would be equal to zero. In various embodiments, because a hallucinated object appears as a stationary input object in the sensing region, the baseline values will, over time, equal the preliminary value, and unlike in FIG. 4, were at time T4 (410), the baseline value is above the preliminary value, when a ghost object exists, the baseline value will not go above the preliminary value because the ghost object does not leave the sensing region. In various embodiments, even though at time T2 (406), the ghost object may be reported as an input object, by increasing the baseline value until the baseline value becomes equivalent to the preliminary value at time T3 (408), the possibility that a real input object is determines during a later cycle is improved.

Returning to FIG. 3, the above discussion are only examples processing modes for generating a baseline. Other estimation techniques and corresponding processing modes may be used without departing from the scope of the invention.

As discussed above, each delta frame generator (e.g., first delta frame generator (304), second delta frame generator (306)) in FIG. 3 receives input from of a sensor frame from the sensor module (302) and from the corresponding baseline storage (e.g., first baseline storage (308), second baseline storage (310)). Each delta frame generator includes functionality to generate a delta frame. The delta frame includes delta values for each pixel. In other words, the delta frame includes the preliminary values that are adjusted for the corresponding baseline values. Because each delta frame generator uses as input a baseline that is generated using different processing modes, the resulting delta frames may reflect the corresponding processing modes and, therefore, may or may not match.

In one or more embodiments of the invention, the first delta frame generator transmits output to the reporting module (312) and first pixel life information storage (314). The reporting module (312) includes functionality to obtain positional information for detected input objects using the delta values from the first delta frame. The reporting module (312) further includes functionality to report positional information. The reporting of the positional information may be to firmware, device driver, operating system or other component. Further, the positional information in the report may be used to perform actions on the input device and/or electronic system.

The second delta frame generator (306) transmits output to the second pixel life information storage (316). In one or more embodiments of the invention, the second delta frame (306) does not transmit output to a reporting module (312). In such embodiments, the second processing mode with the second delta frame generator (306) acts as a background process and does not directly affect the reporting of the positional information. Thus, the existence of the second processing mode with the second delta frame generator (306) may be hidden from the electronic system in that the electronic system is not directly affected by the second processing mode.

In one or more embodiments of the invention, each pixel life information storage (i.e., first pixel life information storage (314), second pixel life information storage (316)) corresponds to a storage location for storing pixel life information about detected input objects. For each pixel in the delta frame, the pixel life information identifies the amount of time in which an input object is detected as currently and having been located at that pixel. Specifically, for pixels that do not have an input object detected at the location of the pixel, the pixel life information may be zero or a null value to reflect that no input objects are currently detected. For pixels in which an input object is currently detected at the location, the pixel life information reflects the amount of time that the input object has been detected at the location. Various units of measurement may be used to record the amount of time. For example, the amount of time may be recorded as number of sensor frames, seconds or milliseconds, or other unit of measurement. Further, different storage techniques may be used to store the pixel life information. For example, only pixels in which an input object is currently detected may have an entry in the pixel life information. In the example, an identifier of the position of the pixel may be stored with the amount of time in the pixel life information. By way of another example, all pixels may have a corresponding entry in the pixel life information.

Because of the different processing modes to measure the baseline, the first pixel life information may be different from the second pixel life information. For example, consider the scenario in which the first processing mode is snapshot mode and the second processing mode is a high pass temporal filter mode. In the example, a Low Ground Mass (LGM) object, such as a coin, in placed on the surface of the sensing region. The processing system is powered-up and the coin is captured into both baselines. The processing system reports that no input object is at the position of the coin, as both delta-frames remain at zero, provided that the coin has not moved. However, once the coin is removed, then a large positive and negative disturbances appears in the delta-frame images. The reporting engine reports objects in the first delta frame. Since nothing is on the surface of the sensing region, the objects are, by definition, ghost objects. The ghost objects will persist and be reported indefinitely as no relaxation occurs in the first baseline if objects are declared. Furthermore, negative dead spots exist in the sensing surface that are unresponsive to real touch of input objects. However, over time, the ghost objects melt into the second baseline such that the ghost objects are no longer detected in the sensing region and, thus, not in the second pixel life information. In contrast, in the snapshot mode, the baseline is not adjusted temporarily for the input object and, thus, the input object may continue to be reflected in the first pixel life information, albeit aged.

In one or more embodiments of the invention, the comparator (318) includes functionality to compare the first pixel life information with the second pixel life information and update the first baseline with the second baseline. In other words, the comparator (318) includes functionality to determine whether the first pixel life information is consistent with the second pixel life information and replace at least a portion of the first baseline with the second baseline when an inconsistency exists. Performing the comparison is discussed below and in FIG. 7.

Figure 5:
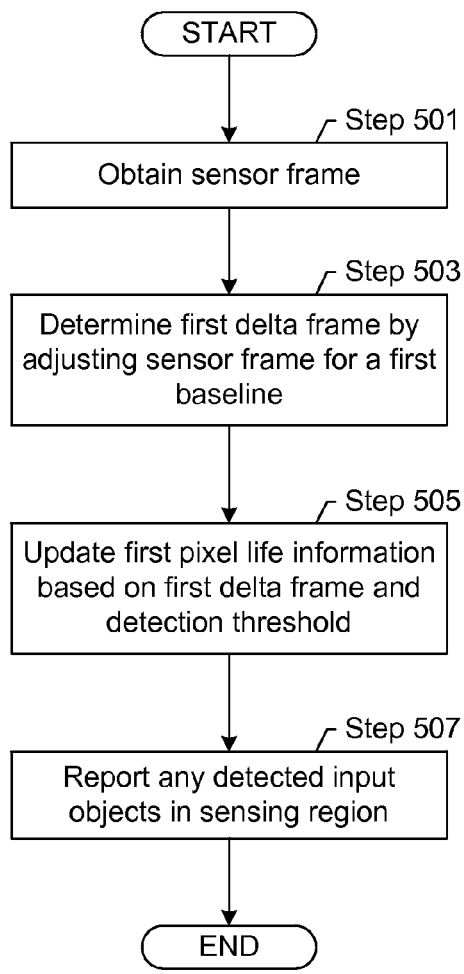
FIGS. 5, 6, and 7 show flowcharts in accordance with one or more embodiments of the invention.
Figure 6:
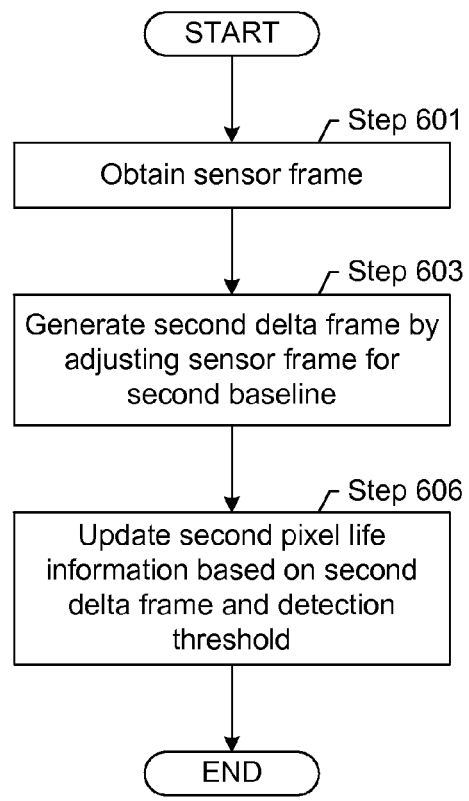
Figure 7:
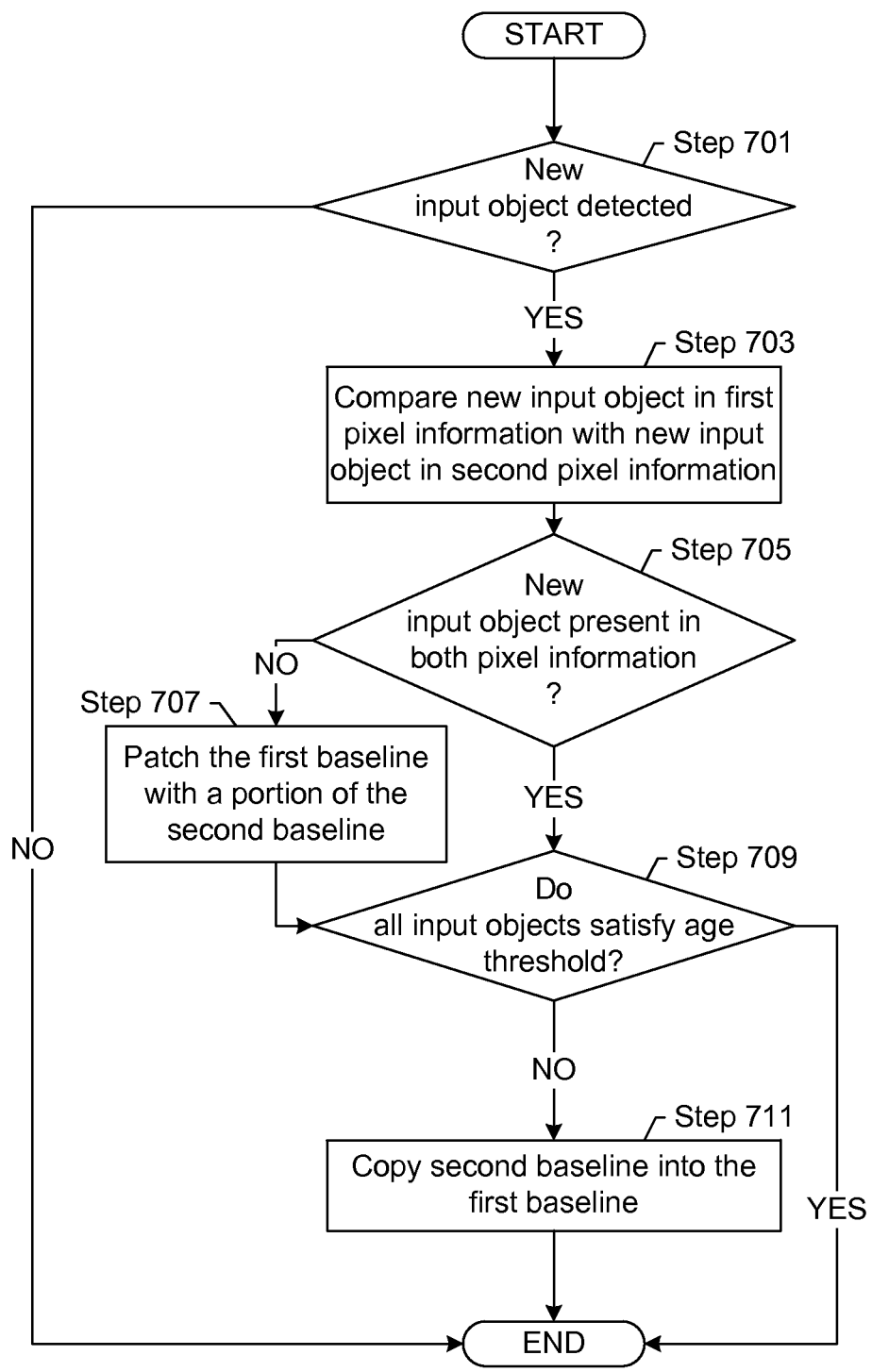

FIGS. 5-7 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 5 shows a flowchart for processing according to the first processing mode in accordance with one or more embodiments of the invention. In Step 501, a sensor frame is obtained. In one or more embodiments of the invention, the processing system scans the sensing region with the sensor electrodes and preliminary values are generated for the sensing region. The sensor module may transmit the preliminary values as a sensor frame to the determination module in one or more embodiments of the invention for processing using the first processing mode. The scanning of the sensing region may be performed using absolute capacitance sensing, transcapacitive sensing, another sensing method, or a combination of sensing methods.

In Step 503, the first delta frame is determined by adjusting the first sensor frame for the first baseline. In particular, on a per pixel basis, each preliminary value is adjusted by the baseline value in the first baseline. In other words, the corresponding baseline value may be subtracted from the pixel value to obtain the delta value. When the first baseline is an accurate estimate of the background capacitance, each input object present in the sensing region may be identified by a positive value in the corresponding position of the delta frame, while the remaining positions in the delta frame are zero or near zero regardless of noise. In some embodiments of the invention, where the baseline value incorrectly reflects the existence of an input object or noise, the pixel value may be zero even when an input object is in the sensing region or negative when the input object is not in the sensing region.

In Step 505, the first pixel life information is updated based on the first delta frame and a detection threshold. In one or more embodiments of the invention, the delta values in the first delta frame are compared to the detection threshold. In one or more embodiments of the invention, the detection threshold is the minimum value in which an input object is detected as being present at the location in the sensing region. Thus, for example, if the delta value is near zero and less than the detection threshold, then no input object is detected even though the delta value may be greater than zero. In one or more embodiments of the invention, for each pixel in the delta frame, a determination is made whether the value of the pixel in the delta frame (i.e., delta value) is greater than the detection threshold. If the delta value is greater than the detection threshold, then the pixel life information for the pixel is increased. The pixel life information for the remaining pixels are reset, such as to zero or null, to reflect that no input object is detected at the corresponding pixel.

In one or more embodiments of the invention, by adjusting the pixel life information on a per pixel basis, an input object that moves in the sensing region is treated as a new input object with each move. In other words, because the input object is moved, the pixel life information of the pixel at the previous position of the input object is reset while the pixel life information of the pixel at the new position of the input object is changed from the reset value to indicate a new input object.

In Step 507, any detected input objects in the sensing region are reported in accordance with one or more embodiments of the invention. In particular, positional information is reported for detected input objects. Based on the reporting, the electronic system, GUI, or other component may be modified in accordance with the detection of the input object.

FIG. 6 shows a flowchart for processing according to the second processing mode in accordance with one or more embodiments of the invention. In Step 601, a sensor frame is obtained in one or more embodiments of the invention. The obtained sensor frame may correspond to the sensor frame obtained in Step 501. In particular, the processing under the second processing mode may obtain the same sensor frames as the processing under the first processing mode.

In Step 603, a second delta frame is generated by adjusting the sensor frame for the second baseline in accordance with one or more embodiments of the invention. In Step 605, the second pixel life information is updated based on the second delta frame and the detection threshold in accordance with one or more embodiments of the invention. Steps 603 and Step 605 may be performed in a same or similar manner to Steps 503 and Steps 505 discussed above, but with using the second baseline. Thus, the pixel life information reflects the baseline that is adjusted according to the second processing mode. In one or more embodiments of the invention, the processing according to the second processing mode ends after updating the pixel life information without performing any reporting. Thus, the processing in FIG. 6 is background processing of the sensor frame that is performed solely to update the second baseline and determine whether the first baseline is accurate in accordance with one or more embodiments of the invention. In other words, the processing using the second processing mode is performed solely for baseline management.

FIG. 7 shows a flowchart for baseline management in accordance with one or more embodiments of the invention. In one or more embodiments of the invention, FIG. 7 is individually performed for each sensor frame. Further, FIG. 7 may be performed, for example, after the pixel life information is updated in FIGS. 5 and 6 for the sensor frame. In other words, as the sensor frames are obtained and processed, FIG. 7 is performed for the sensor frame to compare the baselines.

In Step 701, a determination is made whether a new input object is detected in accordance with one or more embodiments of the invention. Determining whether a new input object is detected may be performed separately, for each pixel life information. In other words, the new input object may be detected in the first pixel life information, the second pixel life information, or both the first and second pixel life information. Further, determining whether a new input object is detected may include determining whether the amount of time in the pixel life information indicates that the current sensor frame is the first sensor frame in which the input object is present at the current pixel or set of pixels. As discussed above, an input object may move in the sensing region and still be a new input object for the purposes of Step 701. If the input object is not a new input object, then the first baseline is not adjusted and the method may proceed to end.

If a new input object is detected, in Step 703, the new input object in the first pixel information is compared with the new input object in the second pixel information in accordance with one or more embodiments of the invention. In particular, the pixel having the new input object is identified. The entry in the first pixel life information and the entry in the second pixel life information that correspond to the new input object are obtained. A determination is made whether the new input object is present in both the first and second pixel life information in accordance with one or more embodiments of the invention in Step 705. Specifically, a determination is made whether the amount of time for both entries corresponding to the pixel having the new input object is the same.

In Step 707, if the new input object is not present in both the first and second pixel life information, then the first baseline is patched with a portion of the second baseline in accordance with one or more embodiments of the invention. Patching the first baseline with the second baseline may include selecting a subset of the second baseline to copy into the first baseline. In particular, the baseline values corresponding to the one or more pixels having the input object are copied from the second baseline to the first baseline.

Additionally, in some embodiments of the invention, additional baseline values of a threshold distance of surrounding pixels may also be copied from the second baseline into the first baseline.

Continuing with FIG. 7, in Step 709, a determination is made whether all input objects satisfy an age threshold in accordance with one or more embodiments of the invention. Specifically, the age threshold is set such that valid input objects would likely appear within the age threshold time period of the new input object while ghost objects may exist beyond the age threshold.

For example, consider the scenario in which a user is performing a two finger gesture. In performing the two finger gesture, the user may place a first finger on the sensing region and then a second finger. To the user, the placement of the second finger may appear to be at the same time as the placement of the first finger. However, the second finger may be first detected in a different sensor frame than the first finger. Thus, the pixels in which the second finger is placed and the pixel in which the first finger is placed may have different age thresholds in at least one of the pixel life information. Next, in the example, consider the scenario in which the first pixel life information also erroneously reflects an input object that has been present for a much longer amount of time because the first baseline has a ghost object. In the example scenario, while the pixel corresponding to the first finger will satisfy the age threshold when the second finger is detected, the pixel corresponding to the ghost finger will not satisfy the age threshold. Thus, in the example, the test in Step 709 will result in "No" in one or more embodiments of the invention.

In one or more embodiments of the invention, the age threshold is set to accommodate gestures in which a group of input objects are to be placed on the sensing region at exactly the same time and gestures in which a group of input objects that are to be placed on the sensing region over different times, such as multi-finger tapping gestures. For example, the age threshold may be set to three seconds.

The determination of whether all input objects satisfy the age threshold may be performed by comparing the amount of time in the pixel life information with the age threshold. If the amount of time in the pixel life information for at least one pixel exceeds the age threshold, then the method proceeds to Step 711. The pixel life information that may be compared with the age threshold may be the first pixel life information, the second pixel life information, or both the first and second pixel life information.

If all input objects do not satisfy an age threshold, the second baseline is copied into the first baseline in Step 711 in accordance with one or more embodiments of the invention. In one or more embodiments of the invention, the entire second baseline is copied into the first baseline. In other words, the first baseline is replaced by the second baseline. By copying the second baseline into the first baseline, the first baseline at least temporarily reflects the second processing mode. However, after the copy, the first baseline is updated using the first processing mode while the second baseline is updated using the second processing mode.

Although FIG. 7 shows Steps 705-711 being performed in a particular order, as discussed above, the various steps of the flowchart may be performed in virtually any order. For example, Steps 705 and 709 may be combined or performed in sequence to determine whether to copy any portion of the second baseline into the first baseline and, if the determination is made to copy, then how much to copy. Next, in the example, Steps 707 and 711 may be combined to perform the copy of the portion or the whole baseline as determined in the previous steps.

Figure 8:
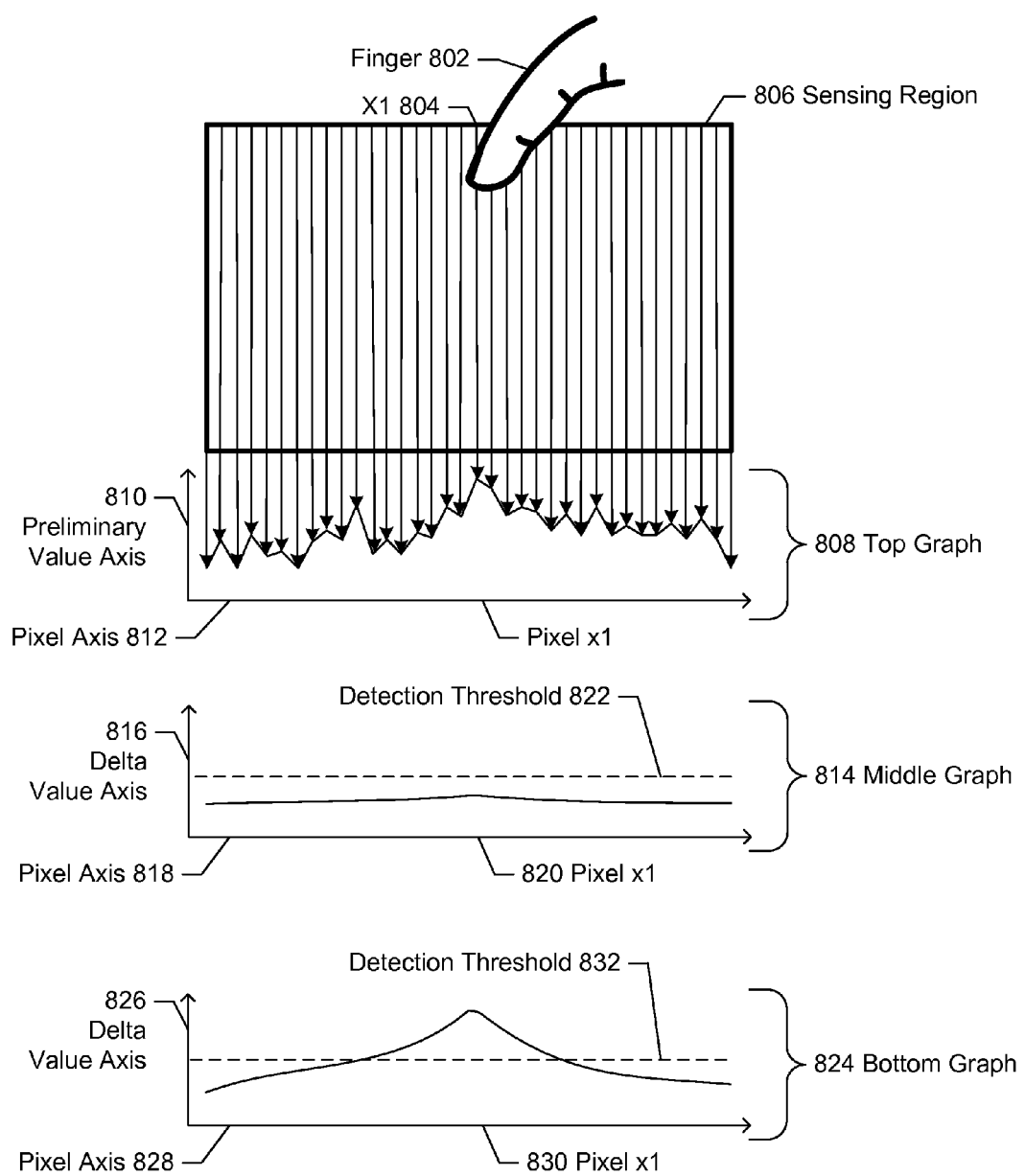
FIG. 8 shows an example in accordance with one or more embodiments of the invention.

FIG. 8 shows an example in accordance with one or more embodiments of the invention. The following example is for explanatory purposes only and not intended to limit the scope of the invention. In the example, consider the scenario in which the first mode is snapshot mode and the second mode is a high pass temporal filter mode on a per pixel basis. In the example scenario, both the first initial baseline and the second initial baseline are initially captured about the same time at power up of the processing system. At the time of the power up, a user's finger A is on the surface of the sensing region at position x1 along the x-axis and captured in both baselines. Later, a user's finger B is placed elsewhere on the surface of the sensing region before user's finger A is lifted from the surface sensing region. When user's finger A is lifted, a dead spot exists at the position x1 in both baselines.

In the example, over the span of several subsequent sensor frames, because the subsequent sensor frames do not reflect an input object at pixel x1, the high pass temporal filter mode baseline is updated from the second initial baseline such that the ghost object is no longer present in the second subsequent baseline. However, the first initial baseline being updated using the snapshot mode may remain the same of the span of the several subsequent sensor frames because the finger B is present and detected in the first baseline. The first baseline is used to report the presence of input objects. Because the first baseline includes a peak at pixel x1, over the subsequent sensor frames, a trough is located in the delta frames at pixel x1 and, correctly, no input object is reported.

Turning now to FIG. 8 and continuing with the example, FIG. 8 shows an example diagram of when after the several subsequent frames, a finger (802) is again placed at pixel x1 (804) along the x-axis of the sensing region (806). As a result, a sensor frame is captured with the preliminary values using absolute capacitance sensing. The top graph (808) in FIG. 8 is a graph of the preliminary values along the x-axis of the sensing region. In the top graph (808), the preliminary value axis (810) provides the magnitude of the preliminary values and the pixel axis (812) shows the position of the pixels. The vertical lines from the sensing region (806) to the top graph (808) are shown for illustrative purposes to align the top graph with the sensing region (806). As shown by the multiple peaks in the top graph, although only a single finger is in the sensing region, the sensor frame includes much noise. The baseline is used to filter out the noise.

Turning now to the middle graph of FIG. 8, the middle graph (814) is a graph of the delta values along the x-axis of the sensing region when the snapshot processing mode is used. In the middle graph (814), the delta value axis (816) provides the magnitude of the delta values and the pixel axis (818) shows the position of the pixels. Because of the peak in the first baseline (discussed above), at pixel x1 (820) in the middle graph (814), only a small peak exists which is less than the detection threshold (822). Thus, erroneously, no input object is detected or reported in the sensing region (806).

The bottom graph (824) is a graph of the delta values along the x-axis of the sensing region when the high pass temporal filter processing mode is used. In the middle graph (824), the delta value axis (826) provides the magnitude of the delta values and the pixel axis (828) shows the position of the pixels. Because of the second baseline was adjusted over the several sensor frames (discussed above), no peak exists at pixel x1 (830) in the bottom graph (824) that is greater than the detection threshold (832). Thus, a new input object is detected and the second pixel life information is updated.

Based on the new input object, a determination is made whether first pixel life information matches the second pixel life information. Because the first pixel life information was not updated for the finger in contrast to the second pixel life information, the first pixel life information does not match the second pixel life information. Thus, the first baseline is patched with the second baseline by copying baseline values at pixel x1 and surrounding pixels from the second baseline into the first baseline.

As shown by way of the example, the first baseline and first processing mode is used to report input objects in the sensing region. The second baseline and second processing mode is used to manage the first baseline and to update the first baseline when the first baseline is not correctly updated by the first processing mode. In other words, the first baseline is generally updated in accordance with the first processing mode, but the second baseline is used to occasionally update the first baseline. Further, the first processing mode and the second processing mode are performed concurrently for each sensor frame in one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for sensing, comprising:
 a sensor module comprising sensor circuitry coupled to a plurality of sensor electrodes, the sensor module configured to acquire a first sensor frame, wherein the first sensor frame is a capture of a sensing region that provides a state of the sensing region; and
 a determination module connected to the plurality of sensor electrodes and configured to:
  determine a first delta frame from the first sensor frame and a first baseline, wherein the first baseline is generated using a first processing mode,
  determine a second delta frame from the first sensor frame and a second baseline,
   wherein the second baseline is generated using a second processing mode, and
   wherein the second processing mode is different than the first processing mode, and
  determine that the first delta frame and the second delta frame are inconsistent with respect to at least one input object,
 wherein the processing system copies at least a portion of the second baseline to the first baseline based on the first delta frame and the second delta frame being inconsistent with respect to the at least one input object.

2. The processing system of claim 1,
 wherein the first processing mode is snapshot mode, and
 wherein the second processing mode is high pass temporal filter mode applied per pixel.

3. The processing system of claim 1,
 wherein copying the at least a portion of the second baseline to the first baseline is further performed based on detecting that the at least one input object comprises a new input object.

4. The processing system of claim 1, wherein determining that the first delta frame and the second delta frame are inconsistent with respect to at least one input object comprises:
 detecting, in the first delta frame, a presence of an input object of the at least one input object, wherein the input object is not present in the second delta frame.

5. The processing system of claim 4, wherein copying the at least a portion of the second baseline to the first baseline comprises patching the first baseline with a portion of the second baseline.

6. The processing system of claim 1, wherein determining that the first delta frame and the second delta frame are inconsistent with respect to at least one input object comprises:
 detecting, in the second delta frame, a presence of an input object of the at least one input object, wherein the input object is not present in the first delta frame.

7. The processing system of claim 1, wherein determining that the first delta frame and the second delta frame are inconsistent with respect to at least one input object comprises:
 determining, in the first delta frame, a new input object of the at least one input object,
 determining, in the first delta frame, an existing input object of the at least one input object, and
 determining that an age of the existing input object satisfies an age threshold,
 wherein copying the at least a portion of the second baseline comprises copying the entire baseline based on the age of the existing input object being greater than the age threshold.

8. The processing system of claim 1, wherein the first sensor module is further configured to acquire a second sensor frame, and wherein the determination module is further configured to:
 determine a first delta frame from the first sensor frame and a first baseline, wherein the first baseline is generated using a first processing mode,
 detect an input object using the first delta frame, and
 report the input object based on detecting the input object using the first delta frame.

9. The processing system of claim 1, wherein the determination module is further configured to:
 generate first pixel life information from the first delta frame, wherein the first pixel life information comprises, for each pixel of the first delta frame, a number of first preceding frames in which any input object located at the pixel is present at the pixel, wherein the first preceding frames are each generated using the first processing mode, and
 generate second pixel life information from the second delta frame, wherein the second pixel life information comprises, for each pixel of the second delta frame, a number of second preceding frames in which any input object located at the pixel is present at the pixel, wherein the second preceding frames are each generated using the second processing mode,
 wherein the determining that the first delta frame and the second delta frame are inconsistent with respect to the at least one input object comprises comparing the first pixel life information with the second pixel life information.

10. The processing system of claim 1, wherein the first sensor frame is gathered using at least one selected from a group consisting of transcapactive sensing and absolute capacitive sensing.

11. An input device comprising:
an array of sensor electrodes configured to sense input objects in a sensing region of the input device; and
a processing system configured to:
   determine a first delta frame from a first sensor frame and a first baseline, wherein the first sensor frame is acquired from the array of sensor electrodes, wherein the first baseline is generated using a first processing mode, wherein the first sensor frame is a capture of a sensing region that provides a state of the sensing region,
   determine a second delta frame from the first sensor frame and a second baseline, wherein the second baseline is generated using a second processing mode, and wherein the second processing mode is different than the first processing mode,
   determine that the first delta frame and the second delta frame are inconsistent with respect to at least one input object, and
   copy at least a portion of the second baseline to the first baseline based on the first delta frame and the second delta frame being inconsistent with respect to the at least one input object.

12. The input device of claim 11, wherein determining that the first delta frame and the second delta frame are inconsistent with respect to at least one input object comprises:
   detecting, in the first delta frame, a presence of an input object of the at least one input object, wherein the input object is not present in the second delta frame.

13. The input device of claim 12, wherein copying the at least a portion of the second baseline to the first baseline comprises patching the first baseline with a portion of the second baseline.

14. The input device of claim 11, wherein determining that the first delta frame and the second delta frame are inconsistent with respect to at least one input object comprises:
   determining, in the first delta frame, a new input object of the at least one input object,
   determining, in the first delta frame, an existing input object of the at least one input object, and
   determining that an age of the existing input object satisfies an age threshold,
   wherein copying the at least a portion of the second baseline comprises copying the entire baseline based on the age of the existing input object being greater than the age threshold.

15. The input device of claim 11, wherein the processing system is further configured to:
   generate first pixel life information from the first delta frame, wherein the first pixel life information comprises, for each pixel of the first delta frame, a number of first preceding frames in which any input object located at the pixel is present at the pixel, wherein the first preceding frames are each generated using the first processing mode, and
   generate second pixel life information from the second delta frame, wherein the second pixel life information comprises, for each pixel of the second delta frame, a number of second preceding frames in which any input object located at the pixel is present at the pixel, wherein the second preceding frames are each generated using the second processing mode,
   wherein the determining that the first delta frame and the second delta frame are inconsistent with respect to the at least one input object comprises comparing the first pixel life information with the second pixel life information.

16. A method for sensing comprising:
determining a first delta frame from a first sensor frame and a first baseline, wherein the first baseline is generated using a first processing mode, wherein the first sensor frame is a capture of a sensing region that provides a state of the sensing region,
determining a second delta frame from the first sensor frame and a second baseline, wherein the second baseline is generated using a second processing mode, and wherein the second processing mode is different than the first processing mode,
determining that the first delta frame and the second delta frame are inconsistent with respect to at least one input object, and
copying at least a portion of the second baseline to the first baseline based on the first delta frame and the second delta frame being inconsistent with respect to the at least one input object.

17. The method of claim 16, wherein determining that the first delta frame and the second delta frame are inconsistent with respect to at least one input object comprises:
   detecting, in the first delta frame, a presence of an input object of the at least one input object, wherein the input object is not present in the second delta frame.

18. The method of claim 17, wherein copying the at least a portion of the second baseline to the first baseline comprises patching the first baseline with a portion of the second baseline.

19. The method of claim 16, wherein determining that the first delta frame and the second delta frame are inconsistent with respect to at least one input object comprises:
   determining, in the first delta frame, a new input object of the at least one input object,
   determining, in the first delta frame, an existing input object of the at least one input object, and
   determining that an age of the existing input object satisfies an age threshold,
   wherein copying the at least a portion of the second baseline comprises copying the entire baseline based on the age of the existing input object being greater than the age threshold.

20. The method of claim 16, further comprising:
generating first pixel life information from the first delta frame, wherein the first pixel life information comprises, for each pixel of the first delta frame, a number of first preceding frames in which any input object located at the pixel is present at the pixel, wherein the first preceding frames are each generated using the first processing mode, and
generating second pixel life information from the second delta frame, wherein the second pixel life information comprises, for each pixel of the second delta frame, a number of second preceding frames in which any input object located at the pixel is present at the pixel, wherein the second preceding frames are each generated using the second processing mode, and
wherein the determining that the first delta frame and the second delta frame are inconsistent with respect to the at least one input object comprises comparing the first pixel life information with the second pixel life information.

* * * * *